Jan. 8, 1946.　　　　　M. MALLORY　　　　　2,392,680
PRESSURE IGNITION SYSTEM FOR INTERNAL-COMBUSTION ENGINES
Filed Dec. 13, 1944
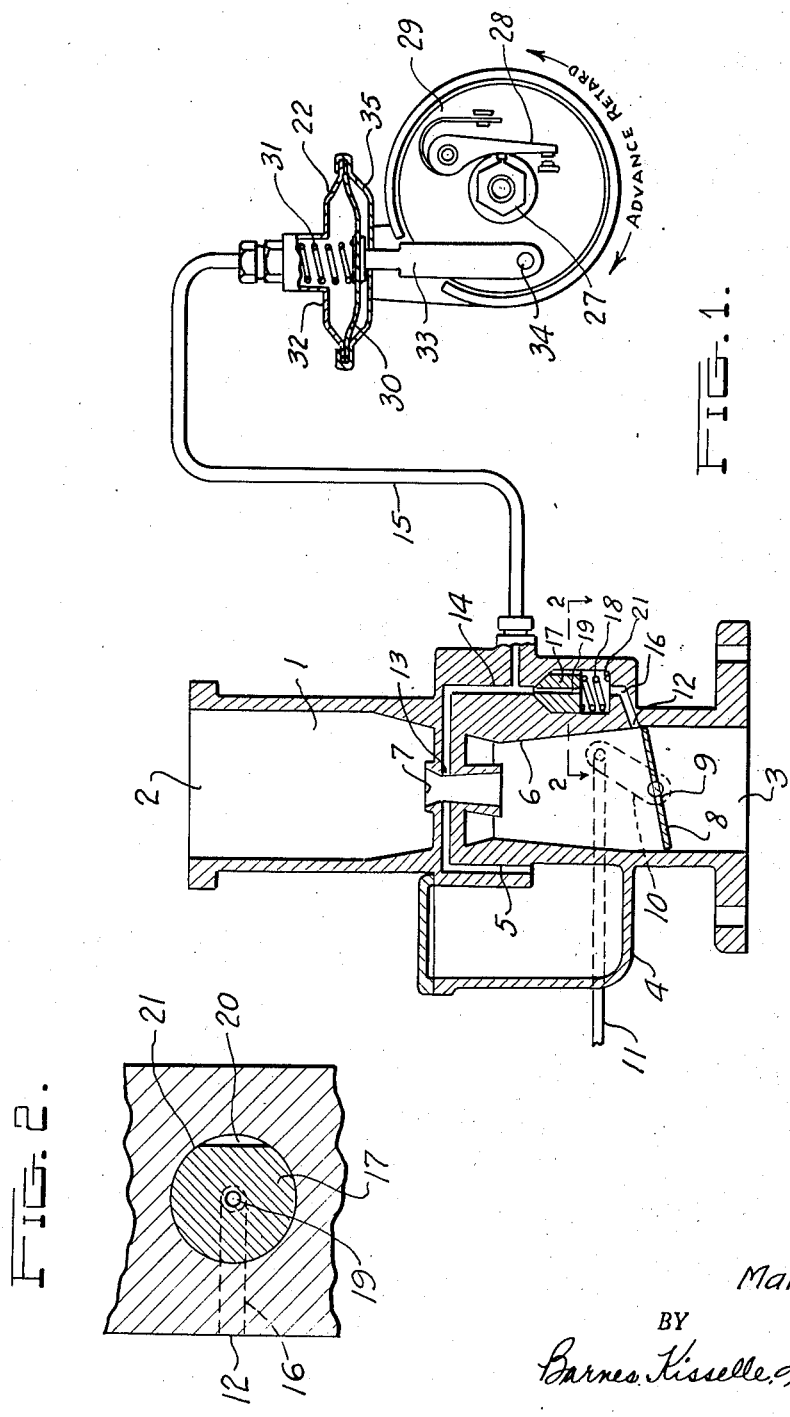
INVENTOR.
Marion Mallory
BY
Barnes, Kisselle, Laughlin & Raisch
Attorneys Patented Jan. 8, 1946

2,392,680

UNITED STATES PATENT OFFICE 2,392,680

PRESSURE IGNITION SYSTEM FOR INTERNAL-COMBUSTION ENGINES

Marion Mallory, Detroit, Mich.

Application December 13, 1944, Serial No. 568,047

6 Claims. (Cl. 123—117)

This invention relates to a pressure ignition system for an internal combustion engine.

In general my invention contemplates controlling or utilizing the pressures in the intake passageway of an internal combustion engine so that a single suction or pressure actuated device will retard the spark timing when the engine is idling, advance the spark timing when the engine is working under light loads and reduce the advance of the spark timing when the engine is working under full loads. I have found that if one sets the spark on a certain advance curve that is proper when the engine is working on wide open throttle or full load, there will not be enough spark advance when the engine is working on part throttle or part load or when the vacuum in the intake manifold is high. I have also found that an engine should not have much more spark advance than the wide open throttle load curve spark advance if the vacuum in the intake manifold drops below about ten inches of mercury. In fact, if the intake manifold vacuum drops to about ten inches of mercury or less, then much more spark advance than the load curve spark advance will cause the engine to run roughly, inefficiently and with spark knocking. Therefore, my invention contemplates an ignition timing control which will retard the spark advance to a point not much more than the load curve spark advance whenever or as soon as the vacuum in the intake manifold drops to about ten inches of mercury.

Fig. 1 is a sectional view partly in elevation showing the mechanism of my ignition timing control means for an internal combustion engine.

Fig. 2 is a section along the line 2—2 of Fig. 1.

The parts of my ignition timing control means are referenced as follows: intake passageway 1, air inlet 2, outlet 3 to the engine intake manifold, fuel bowl 4, fuel passageway 5, main venturi 6, auxiliary venturi 7, throttle valve 8 mounted on throttle shaft 9, arm 10 fixed on shaft 9, throttle lever control rod 11, orifice 12 immediately adjacent, and on the atmosphere side of, throttle valve 8 when closed for idle, orifice 13 in venturi 7, conduit 14 connecting orifice 13 with conduit 15, conduit 16 connecting orifice 12 with conduit 15, valve 17, compression spring 18 tending to hold valve 17 closed, bypass passageway 19 through valve 17 providing continuous communication between orifice 12 and conduit 15, flat or relieved face 20 on valve 17, cylinder 21 for piston valve 17.

The timing mechanism is conventional and as shown consists of the usual rotatable cam 27 which operates the electrical circuit breaker 28. The circuit breaker 28 is mounted on the plate 29 which can be rotated clockwise to advance the spark and counterclockwise to retard the spark. A suction device 22 is utilized for advancing and retarding the spark. The suction device comprises a flexible diaphragm 30 backed up by a compression coil spring 31. The diaphragm 30 is mounted in the housing 32 which is connected to the carburetor by conduit 15. The diaphragm is connected to plate 29 by connecting rod 33, one end of which is pivotally connected as at 34 to the plate 29 and the other end of which is fixed to the diaphragm. The wall 35 of the housing is perforated so that the diaphragm is subjected on the outside to atmospheric pressure; whereas, on the inside of the housing 32, the diaphragm is subjected through line 15 to the booster venturi 13 and to orifice 12, located between the throttle and venturi 7.

The operation of my device is as follows: spring 18 is tensioned or adjusted to close valve 17 whenever the vacuum at orifice 12 falls to about, or in the neighborhood of, nine or ten inches of mercury. Assuming that the engine is idling, throttle 8 will be almost closed and orifice 12 will be located between the throttle and venturi 7. Valve 17 will be closed. Under such conditions the suction device 22 will not be subjected to enough vacuum to advance the ignition timer against spring 31. Naturally the spark will be in retarded position when the engine is idling.

If the throttle 8 is moved slightly towards an open position, orifice 12 will be placed into the manifold vacuum. The vacuum will be very high at orifice 12 because the throttle is not far enough open to bleed the manifold vacuum down. This high vacuum will pull piston 17 downwardly compressing spring 18 and the suction device will be subjected to the high vacuum through channel 19 and by flat 20 on piston 17. Of course, orifice 13 in the venturi tends to bleed the high suction down in channel 15 but not enough to prevent the suction device from advancing the spark to its highest position. If throttle 19 is opened still further, the vacuum at orifice 12 will decrease and when it reaches about nine or ten inches of mercury, spring 18 will move piston 17 back against its seat, which closes off the bypass 20 on the side of the piston. Then the suction device is only connected to the intake manifold through the small channel 19 in piston 17 and as the air-bleeding effect at orifice 13 is not changed, the spark will be retarded to a point only a little more than what is proper for wide open throttle advance. If throttle valve 8 is held wide open, the suction created by the charge flowing by orifice 13 in venturi 7 will give sufficient spark advance when the engine is operating under full load and wide open throttle.

I have shown bypass passageway 19 as passing directly through valve 17. Obviously this bypass passageway can be about or around valve 17. The importance of restricting bypass passageway 19 becomes evident when one considers the effect of valve 17 without such a bypass. If passageway 19 were omitted and valve 17 completely shut off orifice 12 from suction device 22 whenever the manifold vacuum fell to nine or ten inches of mercury or less and when the throttle is only partly opened, there would not be enough suction at orifice 13 in venturi 7 to advance the spark any at all and the spark would go into almost full retard. Under such conditions the spark would be retarded below the wide open throttle or full load spark advance curve which would cause loss of power and inefficient or uneconomical operation of the engine.

Bearing in mind that the suction in the venturi is never as high on part open throttle as it is on wide open throttle regardless of engine speeds, then if, under the conditions specified in the above paragraph, valve 17 completely closed off orifice 12 from suction device 22 when the intake manifold suction at orifice 12 dropped to about nine or ten inches of mercury at part open throttle, spark knocking would be prevented but the spark advance would be less than the wide open throttle spark advance curve at this engine speed and accordingly the engine would run inefficiently.

Orifice 13 in the venturi acts as an air bleed to the suction device when the throttle is partly open. Thus, orifice 13 will have a greater air-bleeding effect when valve 17 is closed than when valve 17 is open because, when valve 17 is held down away from its seat, both passages 19 and 20 will be subjected to the manifold vacuum.

I claim:

1. In an internal combustion engine having an intake passageway, the combination of an ignition timer, first and second orifices located in said passageway, a throttle valve in the intake passageway, the said two orifices being positioned so that the throttle valve moves between the two orifices as it moves toward an open position thereby subjecting the first orifice to the manifold suction when the throttle is opened and placing both of the orifices on the atmosphere side of the throttle when the throttle is closed or at idling position, a conduit connecting the two orifices together, a suction actuated device which controls the ignition timer connected to said conduit, valve means controlling communication through said conduit between the said first orifice and the suction device, a bypass passageway through which the first orifice constantly communicates with said suction device, said valve means closing whenever the intake passageway vacuum at said first orifice falls below a predetermined point whereby communication between the first orifice and the suction device is effected through said bypass passageway and the second orifice becomes relatively more of an air bleed to said suction device and said valve means opening whenever the intake passageway vacuum at said first orifice rises above a predetermined point whereby communication between the first orifice and the suction device is effected both through the said conduit and bypass passageway and the second orifice becomes relatively less of an air bleed to said suction device.

2. In an internal combustion engine having an intake passageway and a throttle valve for controlling the flow of motive fluid through said passageway, the combination of an ignition timer, a first orifice located in said passageway adjacent to and on the atmosphere side of said throttle valve when closed for idling and passing on to the engine side of said throttle valve when the throttle valve is opened from idle position, a second orifice located in said passageway always on the atmosphere side of said throttle valve, a suction actuated device connected to and controlling the advance of said ignition timer, a conduit having two branches each connecting the first orifice with said suction device, a conduit connecting said second orifice with the suction device, valve means responsive to pressure conditions obtaining in the intake passageway at said first orifice for controlling communication through one of said branches between said first orifice and the suction device, said valve means opening in response to intake passageway vacuum when the vacuum at the first orifice rises above a predetermined point whereby communication between the first orifice and the suction device is established through both branches of said conduit, said valve means closing one of said branches whenever the intake passageway vacuum at said first orifice falls below a predetermined point whereby the suction device responds to decrease the spark advance at substantially the full load spark advance.

3. The combination as set forth in claim 2 including resilient means for closing said valve means whenever the intake passageway vacuum at the first orifice falls below a predetermined vacuum of about or in the neighborhood of about ten inches of mercury.

4. In an internal combustion engine the combination of an ignition timer, a suction device to advance and retard said ignition timer, an intake passageway having a venturi, an orifice in said venturi, a throttle valve for said passageway on the engine intake manifold side of said venturi, a second orifice into said passageway between the throttle valve and venturi when the throttle is near a closed position, a conduit connecting the first and second named orifices together, a conduit connected to the first conduit and to the suction device, the second named orifice located in a position between the venturi and throttle when the throttle is near a closed position and between the throttle valve and engine as the throttle valve moves towards an open position so that the first named orifice will act as an air bleed to the second named orifice when the second named orifice is placed on the engine intake manifold side of the throttle, a check valve in the first conduit between the second orifice and point of confluence of the first and second mentioned conduits, said check valve opening in response to a predetermined vacuum in the intake passageway at said second orifice, and a passageway bypassing said check valve through which the second orifice communicates constantly with said first orifice and suction device whereby at partly open throttle with the check valve closed the first orifice tends to have a greater air bleed effect on the suction device than when the throttle is partly open and the check valve open.

5. An ignition system for an internal combustion engine having an intake passageway and a throttle valve therein comprising a cam, a contact carrying breaker arm, a relatively fixed contact, movable supporting means for said breaker arm and said relatively fixed contact, said means being adjustable angularly about said cam, mechanism connected to said supporting means for adjusting the same angularly about said cam to advance or retard the spark, said mechanism comprising a pressure responsive diaphragm, a connection between said diaphragm and the adjustable supporting means, a conduit for applying suction on said diaphragm from the intake passageway on the engine side of the throttle valve, a second conduit for applying suction on the diaphragm from the discharge side of the throttle valve in partly open position, a check valve in said second conduit opening towards the discharge side of the throttle valve, and a passageway bypassing said valve for applying suction on the diaphragm from the discharge side of the throttle valve in partly open position even when the check valve is closed.

6. In an internal combustion engine having an intake passageway and a venturi therein, the combination of an ignition timer, first and second orifices located in said passageway, said second orifice being located in said venturi, a throttle valve in the intake passageway on the engine side of said venturi, the said two orifices being positioned so that the throttle valve moves between the two orifices as it moves toward an open position thereby subjecting the first orifice to the manifold suction when the throttle is opened and placing both of the orifices on the atmosphere side of the throttle when the throttle is closed or at idling position, a conduit connecting the two orifices together, a suction actuated device which controls the ignition timer connected to said conduit, valve means controlling communication through said conduit between the said first orifice and the suction device, a passageway bypassing said valve, said valve means closing said conduit whenever the intake passageway vacuum at said first orifice falls below a predetermined point whereby communication between the first orifice and the suction device is effected through said bypass passageway and said valve means opening whenever the intake passageway vacuum at said first orifice rises above a predetermined point whereby communication between the first orifice and the suction device is effected both through the open conduit and bypass passageway.

MARION MALLORY.